US005612948A

United States Patent [19]
Fette et al.

[11] Patent Number: 5,612,948
[45] Date of Patent: Mar. 18, 1997

[54] HIGH BANDWIDTH COMMUNICATION NETWORK AND METHOD

[75] Inventors: Bruce A. Fette, Mesa; Peter J. Leahy, Scottsdale; David M. Harrison, Mesa, all of Ariz.

[73] Assignee: Motorola, Inc., Schaumburg, Ill.

[21] Appl. No.: 342,317

[22] Filed: Nov. 18, 1994

[51] Int. Cl.⁶ ........................................ H04B 7/14
[52] U.S. Cl. ............................ 379/252; 370/468; 455/8; 455/11.1
[58] Field of Search ............... 370/13.1, 14, 17, 370/18, 50, 75, 76, 79, 84, 95.1, 95.3, 16; 375/202, 267, 347; 455/8, 9, 11.1, 33.1, 33.4

[56] References Cited

U.S. PATENT DOCUMENTS

| | | | |
|---|---|---|---|
| 4,747,160 | 5/1988 | Bossard | 455/33 |
| 4,870,642 | 9/1989 | Nohara et al. | 370/75 |
| 5,142,532 | 8/1992 | Adams | 370/94.1 |
| 5,152,002 | 9/1992 | Leslie et al. | 455/11.1 |
| 5,179,559 | 1/1993 | Crisler et al. | 370/95.1 |
| 5,218,618 | 6/1993 | Sagey | 375/1 |
| 5,481,532 | 1/1996 | Hassan et al. | 370/16 |
| 5,483,676 | 1/1996 | Mahany et al. | 455/67.4 |
| 5,487,069 | 1/1996 | O'Sullivan et al. | 370/94.3 |
| 5,490,284 | 2/1996 | Itoh et al. | 455/11.1 |

*Primary Examiner*—Melvin Marcelo
*Attorney, Agent, or Firm*—Jeffrey D. Nehr; Bradley J. Botsch, Sr.

[57] ABSTRACT

A cellular communication network (10) and method operates at frequencies above 2 GHz and achieves widespread coverage within a cell (14) by adapting routing channels, symbol rates, and FEC coding processes (78) to current RF broadcast conditions. A portion of subscriber nodes (16) act as repeaters for a base node (12). If subscriber nodes (16) cannot directly communicate with the base node (12), their communications may be indirectly routed to the base node (12) through one or more repeating subscriber nodes (16'). If current conditions do not support a high data rate, then lower data rates are supported by selection of FEC coding processes (78). If increasingly inclusive FEC coding does not achieve a data rate supportable by current conditions, slower symbol rates may be used. Communications at slower symbol rates may utilize narrower frequency bands thus keeping wider frequency bands available for higher speed usage.

19 Claims, 7 Drawing Sheets

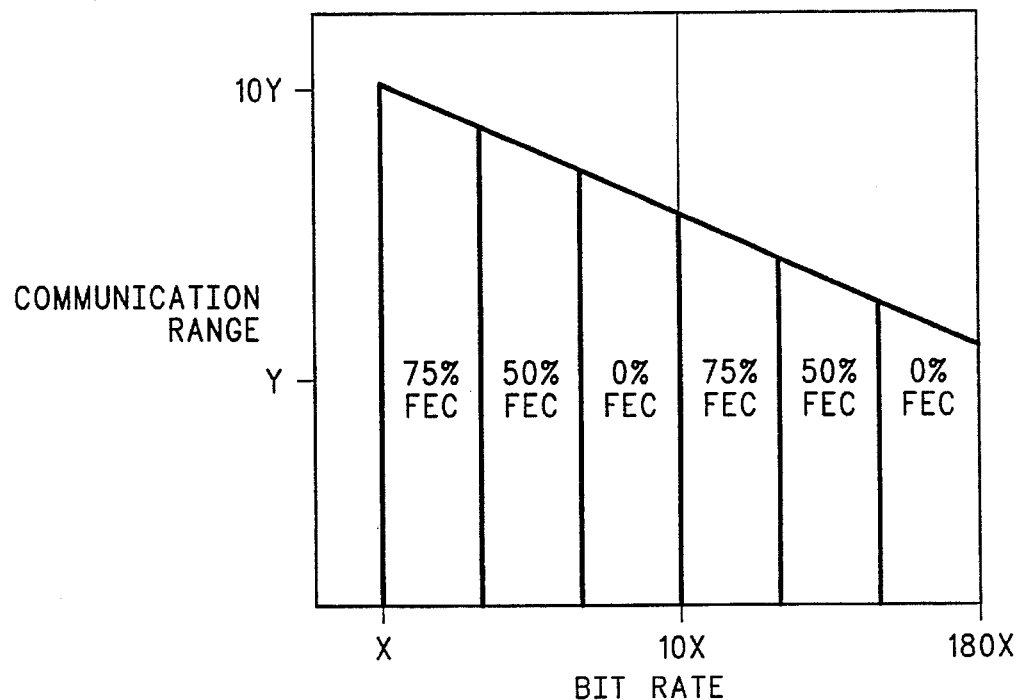
FIG. 6
FIG. 7
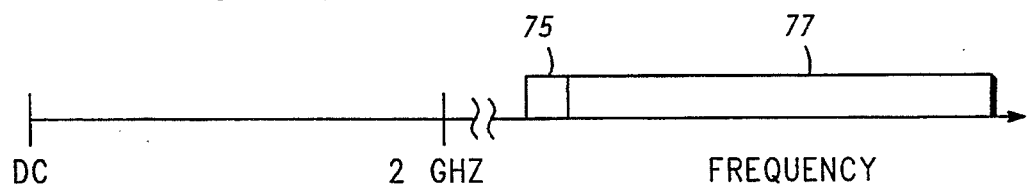

HIGH BANDWIDTH COMMUNICATION NETWORK AND METHOD

FIELD OF THE INVENTION

The present invention relates generally to communication networks. More specifically, the present invention relates to digital communication networks which support high data rates.

BACKGROUND OF THE INVENTION

A communication network provides communication paths that allow various nodes which may couple to the network to communicate with one another. Currently, digital data network paths that include wireless, radio frequency (RF) broadcast communication links are typically limited to operating at data rates of less than 10 megabits per second (Mbps). Networks that support higher data rates typically require nodes to reside at stationary locations so that fiber optic cables, coaxial cables, or other physical high bandwidth transmission media "landlines" may be used for the communication paths. The requirement of landlines is a serious network problem. The infrastructure cost of routing the landlines makes a high bandwidth digital network having generally ubiquitous coverage impractical. Moreover, even if ubiquitous coverage were obtained, the landlines requirement would limit coverage to stationary nodes and prevent mobile nodes from participating in the network.

An RF communication network might possibly supplement a landline network. However, conventional RF communication networks, such as cellular audio communication networks and others, cannot come close to handling high bandwidth data rates. Such conventional RF communication networks operate in lower frequency ranges, such as the L band or below, with relatively narrow frequency bands that are not capable of supporting high data rates. In theory, an RF communication network might possibly operate at a higher frequency range, such as above the L band, and support relatively wideband data rates. But, operation at high frequencies poses other problems.

For example, communications at frequencies above the L band suffer from nearly line-of-sight communication paths. Obstructions, such as hills, buildings, foliage, rain, atmosphere, and other factors can severely deteriorate communication quality. Consequently, widespread and reliable communications within any given area do not naturally occur when operating at such high frequencies.

Another problem with conventional wireless communication networks is their inflexibility. Typically, a wireless network is designed to operate its communication links at only a given symbol rate. This inflexibility limits the network's ability to adjust data rates to track communication link quality, and it consequently limits the likelihood of successfully achieving some level, although perhaps reduced, of communication within a given area of coverage. In addition, this inflexibility limits the network's subscriber's opportunities to pay for communication services in proportion to their demand for such services.

One known technique for increasing the likelihood of successfully communicating within a given area of coverage is a technique known as "flood routing." With flood routing, every network node that hears a message simply repeats the message. A given message is repeated any number of times from any number of different sources. Thus, the likelihood that the given message will be successfully received by an intended recipient is very high. On the other hand, flood routing is an inefficient technique for delivering a large volume of messages. Accordingly, this technique is impractical for a high bandwidth communication network because allocated spectrum would be unnecessarily wasted repeating redundant messages.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a graph depicting analyses performed to identify symbol rates and forward error correction (FEC) processes employed in conveying communications within the communication network;

FIG. 7 shows a graph depicting frequency bands used by the communication network;

DETAILED DESCRIPTION OF THE PREFERRED EMBODIMENTS

Figure 1:
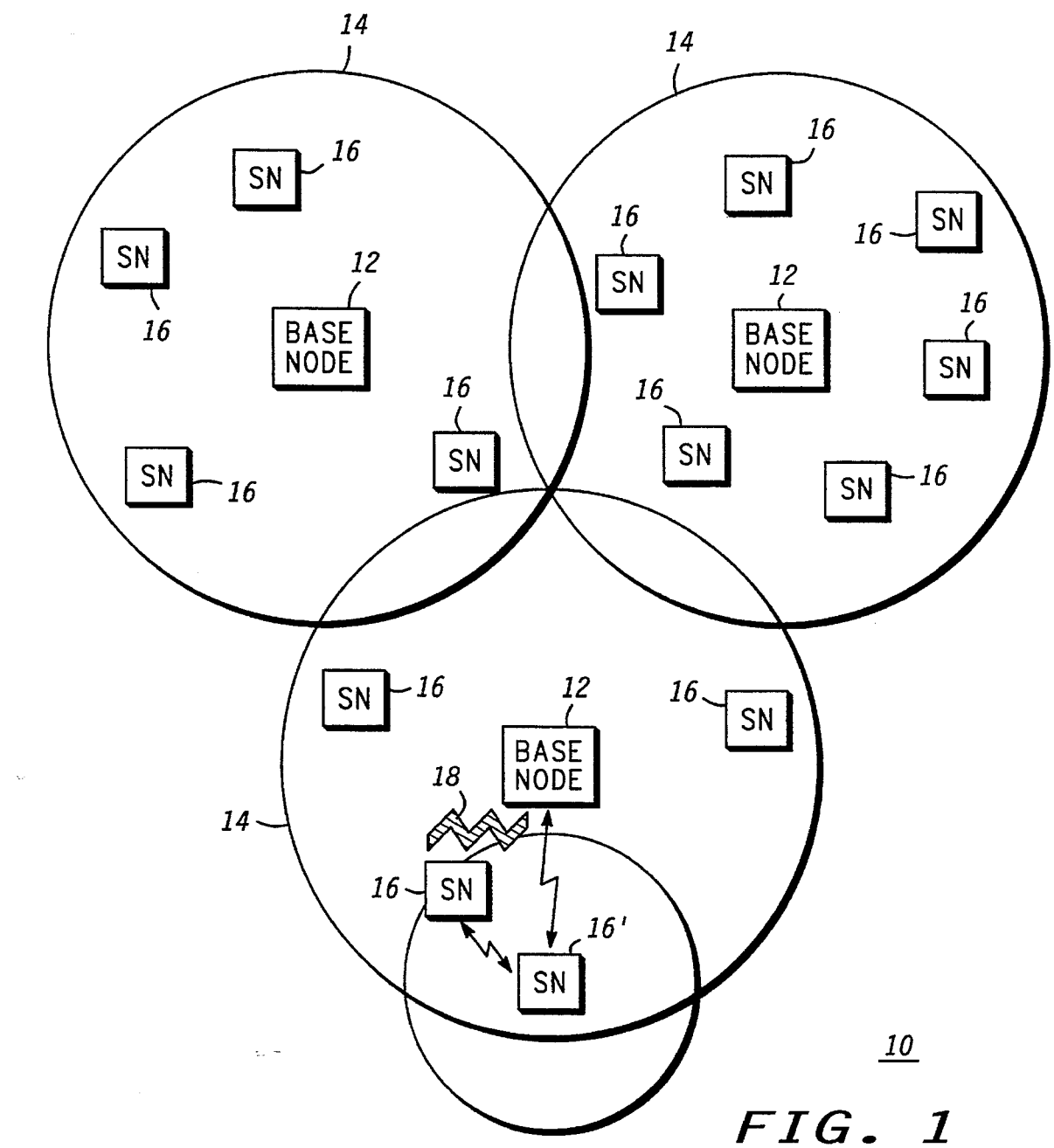
FIG. 1 shows a layout diagram depicting a high bandwidth communication network configured in accordance with the present invention.

FIG. 1 depicts a high bandwidth communication network 10. Network 10 is a cellular radio frequency (RF) communication network that operates at frequency ranges above 2 GHz and preferably around 18 GHz. At these frequencies, wide bandwidths in the range of 100 MHz to 1 GHz, may be available without adversely affecting the vast majority of existing RF communications. Such wide bandwidths are useful in transmitting digital data at high data rates, such as may be required by video, graphics, large computer databases, high speed computer applications, and the like.

Network 10 includes base nodes 12 which preferably reside at facilities (not shown) that also accommodate conventional cellular audio mobile telecommunications switching offices. Such facilities may include buildings, antenna towers, and the like. Base nodes 12 manage communications for network 10 within their corresponding cells 14. However, in an alternate embodiment, a central controlling switch (not shown) may also participate in controlling the communications through landline links to base nodes 12. In the preferred embodiment, cells 14 cover roughly the same geographic areas that may already be covered by the conventional cellular audio telecommunications network. Conventional techniques are used to prevent communications taking place in one cell 14 from interfering with communications taking place in another cell 14. For example, different frequency bands or different spread spectrum coding techniques may be used in different cells.

Any number of subscriber nodes (SN) 16, may reside within cells 14. Subscriber nodes 16 are configured to communicate with base nodes 12. Through base nodes 12, subscriber nodes 16 may communicate with each other or with other devices (not shown) that may couple to base nodes 12 through high bandwidth global information, data, and/or communication networks. Subscriber nodes 16 may be battery powered portable devices, vehicle-mounted mobile devices, or stationary devices.

Due in part to the high frequencies at which network 10 operates, the quality of RF communication links between subscriber nodes 16 and base nodes 12 may vary widely throughout cells 14. In many locations within cells 14 such links may not be available at all. FIG. 1 illustrates an obstruction 18 that prevents the network's RF signals from propagating between one subscriber node 16 and one base node 12. For the high frequencies at which network 10 operates, many geographical, living, and man-made structures are obstructions 18. Thus, any number of obstructions 18 may be present in cells 14, and the quality of communication links may continuously and dramatically change as subscriber nodes 16 move among obstructions 18 and as the environment within cells 14 changes.

Network 10 incorporates various adaptive technologies that provide a variety of options for forming communication links between any given subscriber node 16 and base node 12. As a result of these options, network 10 achieves a high likelihood of successfully conveying communications within cells 14 in spite of using obstruction-prone high frequencies.

One such adaptive technology is provided by the use of repeating subscriber nodes 16'. Any subscriber node 16 may serve as a repeating subscriber node 16', but not all subscriber nodes 16 need to function as repeating subscriber nodes 16'. In particular, portable subscriber nodes 16 may desirably omit the repeating function to conserve their battery reserves. However, mobile or stationary subscriber nodes 16 are typically energized from generators, alternators, public power distribution networks, and the like. These nodes 16 desirably include the repeating subscriber node 16' function. The number and location of repeating subscriber nodes 16' within a cell 14 is assumed to be a random and uncontrollable operating factor for network 10.

Repeating subscriber nodes 16' act as repeaters for base nodes 12. Thus, if a subscriber node 16 cannot directly communicate with its base node 12, the subscriber node 16 still has a good chance of indirectly communicating with the base node 12. The indirect communication takes place through a neighbor repeating subscriber node 16' that can communicate with the base node 12. For clarity, FIG. 1 shows indirect communications as utilizing only one repeating subscriber node 16'. However, indirect communications may use more than one repeating subscriber node 16' to deliver communications between an ultimate subscriber node 16 and its base node 12. More than one repeating subscriber node 16' may be used when the repeating subscriber node 16' with which an ultimate subscriber node 16 can directly communicate is itself obstructed from direct communication with the base node 12.

Figure 2:
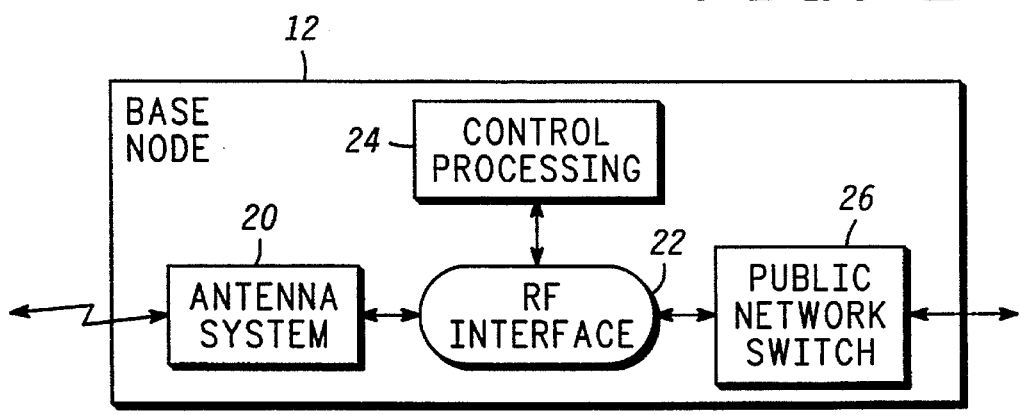
FIG. 2 shows a block diagram of a base node.

FIG. 2 shows a block diagram of a base node 12. Base node 12 includes an antenna system 20. RF communications are conveyed through antenna system 20. Desirably, antenna system 20 is an array of high gain, highly directional antennas. Thus, network 10 may utilize spacial diversity obtained through diverse antenna beams projected in different directions to further reduce interference. Antenna system 20 couples to an RF interface section 22. RF interface section 22 couples to and is controlled by a control processing section 24. In addition, RF interface section 22 couples to a public network switch 26. Public network switch 26 may desirably interface base node 12 to a landline fiber optic or other grid for communicating high speed data.

Figure 3:
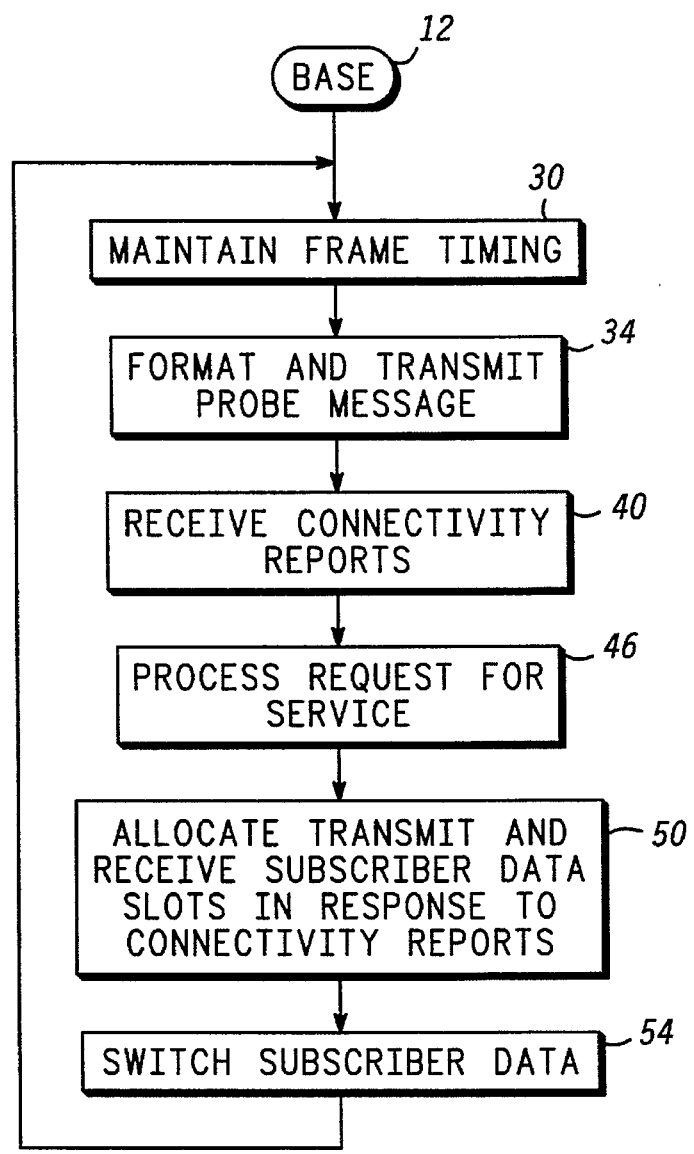
FIG. 3 shows a flow chart of tasks performed by the base node.
Figure 4:
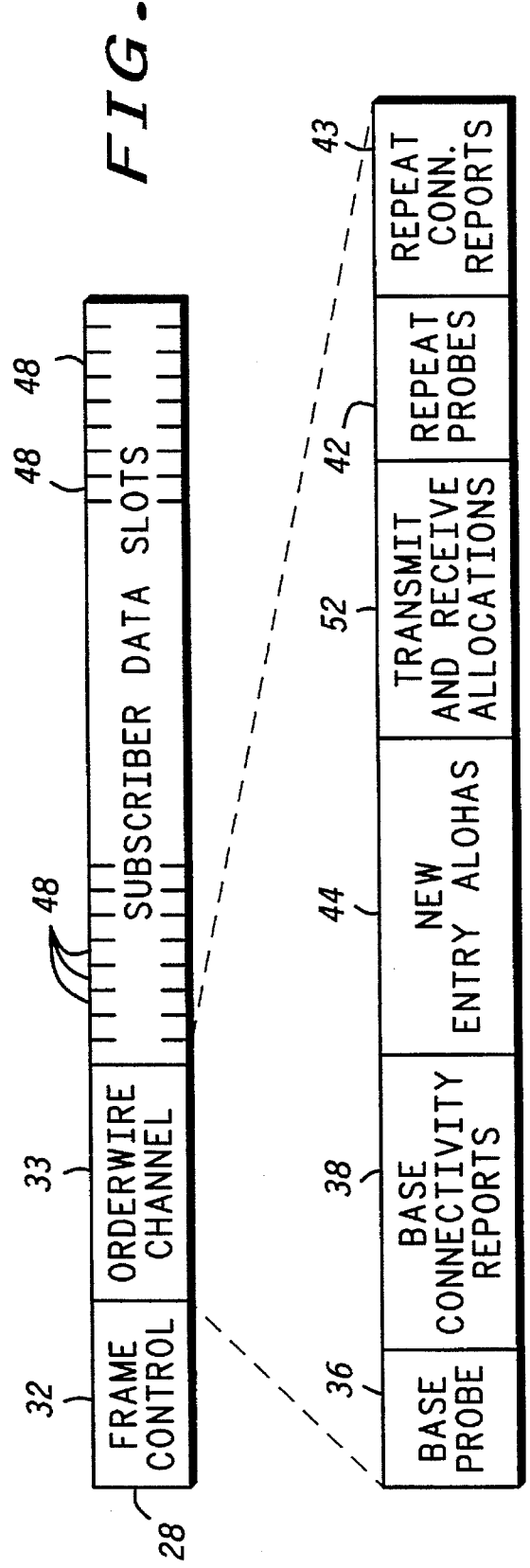
FIG. 4 shows a data format diagram depicting a time division multiplexed frame managed by the base node.

FIG. 3 shows a flow chart of tasks performed by base node 12, and FIG. 4 shows a data format diagram depicting a time division multiplexed frame 28 that is managed by base node 12. Generally speaking, the tasks depicted in FIG. 3 are controlled by computerized processes running in control processing section 24 (see FIG. 2) of base node 12. Through these tasks, base node 12 manages a slotted aloha data communication protocol and the communications taking place within its cell 14.

Referring to FIGS. 3 and 4, base node 12 performs a task 30 to maintain frame timing. Due to task 30, base station 12 generates and transmits a frame control section 32 of frame 28. Frame 28 is preferably 10–100 msec in duration. Frame control section 32 includes a preamble which marks the beginning of frame 28. In addition, frame control section 32 may include data that define the duration for frame 28 and the timing of various sub-frames included within an orderwire channel 33 within frame 28.

Next, during a task 34 base node 12 formats and transmits a base probe message 36. Base probe 36 instructs subscriber nodes 16 (see FIG. 1) to respond to base probe 36 by transmitting a connectivity report. The connectivity report is sent during a base connectivity reports sub-frame 38. The reports may be transmitted at random times within connectivity reports sub-frame 38 to reduce collisions. Base node 12 receives the connectivity reports during a task 40. The connectivity reports inform base node 12 of the identities of the subscriber nodes 16 that can receive its signals. The base probe 36 also instructs repeating subscriber nodes 16' (see FIG. 1) to repeat base probe 36 as a repeater probe 42.

In conjunction with repeating base probes 36, repeating subscriber nodes 16' receive connectivity reports from other subscriber nodes 16 which may not be able to communicate directly with base node 12. Thus, the connectivity report sent from a repeating subscriber node 16' during base connectivity reports sub-frame 38 may include connectivity reports which it has previously received from other nodes 16. Taken together, these connectivity reports inform base node 12 of the identities of subscriber nodes 16 in its cell 14, of routes through repeating subscriber nodes 16' that may be used in conveying communications to the subscriber nodes 16, and of signal quality in the routes. Nothing prevents routes through several different repeating subscriber nodes 16' from being described for any one subscriber node 16.

Subscriber nodes 16 may communicate with base node 12 to request communication services through a new entry alohas subframe 44. Such requests desirably identify the subscriber node 16 making the request, the type of service being requested, and the identity of repeating subscriber nodes 16', if any, involved in repeating the request to base node 12. Base node 12 processes such requests for communication services during a task 46. Based upon the identities of the subscriber nodes 16 for which communication services are currently being provided, upon the types of services being provided, and upon the connectivity reports, base node 12 allocates transmit and receive subscriber data slots 48 to convey data during a task 50. The actual allocations are communicated during a transmit and receive allocations subframe 52. The allocated data slots 48 may be used to convey both system data used to setup calls to subscriber nodes 16 and user data.

Base node 12 controls the routing of communications to and from subscriber nodes 16 within cells 14 (see FIG. 1)

through the allocation of subscriber data slots 48. If a level of communication service requires one transmit slot 48 and one receive slot 48 during a frame 28, then two of slots 48 may be allocated to the service during frame 28 for a subscriber node 16 that directly communicates with base node 12. However, if the subscriber node 16 indirectly communicates with base node 12 through one repeating subscriber node 16', then four slots 48 may be allocated to the service. Two of the four slots are used to convey communications between base node 12 and the repeating subscriber node 16' and the remaining two slots are used to convey communications between the repeating subscriber node 16' and the ultimate subscriber node 16.

Task 50 arranges the allocations of slots 48 in time so that the various links may occur in order. In other words, a slot 48 for data transmitted from base node 12 to a repeating subscriber node 16' is allocated earlier within frame 28 than a slot 48 for data transmitted from repeating subscriber node 16' to an ultimate subscriber node 16. Conversely, a slot 48 for data received at a repeating subscriber node 16' from an ultimate subscriber node 16 is allocated within frame 28 before a slot 48 for data received at base node 12 from the repeating subscriber node 16'. The repeating subscriber node 16' stores the data it receives for a short period of time, which is desirably less than one frame 28, then forwards or transmits it onward in the allocated slot 48.

After task 50, a task 54 switches subscriber data as appropriate for services being provided for each subscriber. Referring to FIG. 2, this switching task may route data between antenna system 20 and public network switch 26. Alternatively, this switching task may route data received at antenna system 20 back to antenna system 20 for transmission.

Figure 5:
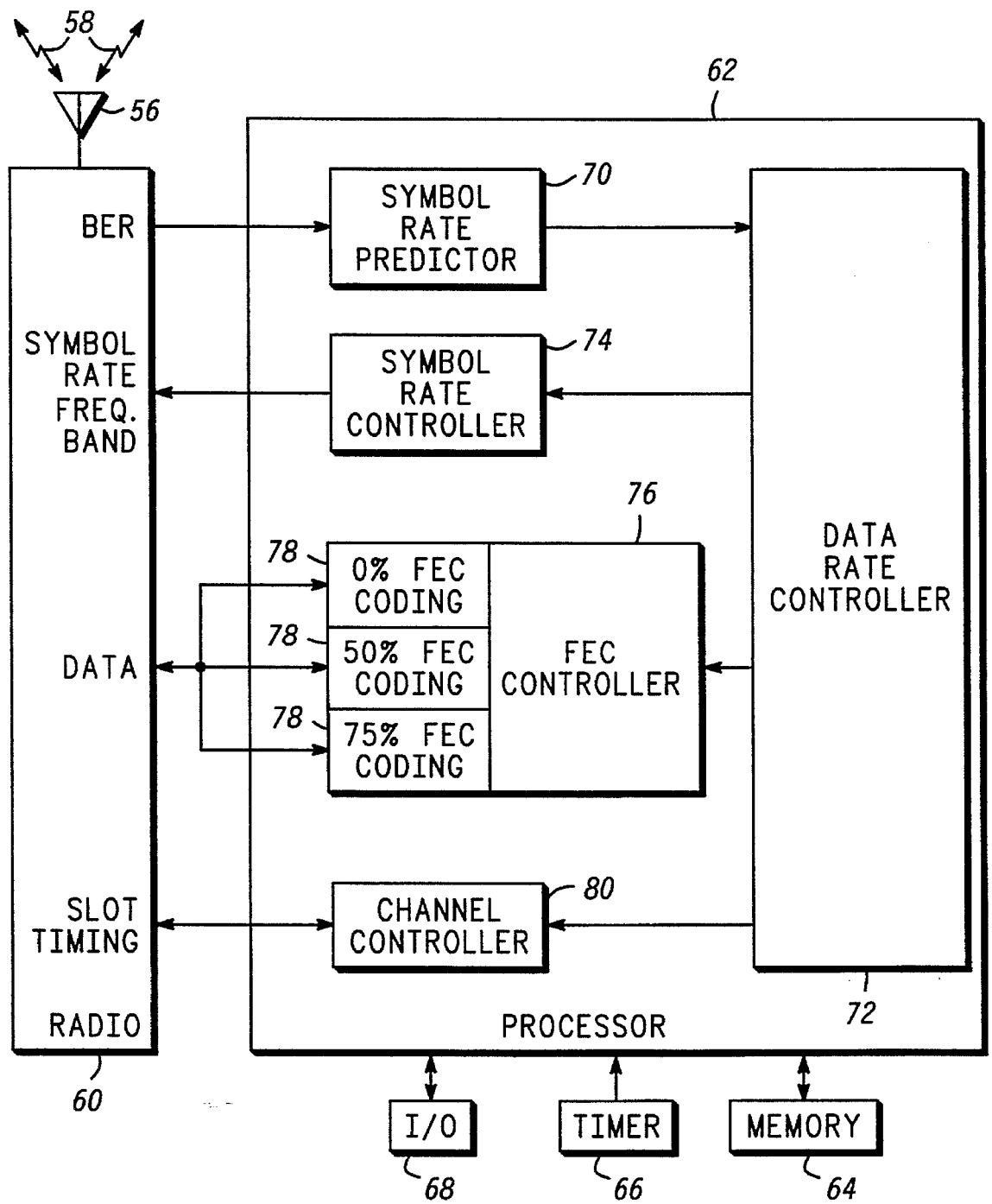
FIG. 5 shows a block diagram of a subscriber node.

FIG. 5 shows a block diagram of a subscriber node 16. An antenna array 56 transmits and receives signals 58 to and from base node 12 and other subscriber nodes 16. In the preferred embodiment, antenna array 56 is a high gain, directional antenna array which may be relatively small in size due to the frequencies used by network 10. Antenna array 56 couples to a radio system 60 which includes a transmitter and receiver. Radio system 60 couples to a control processor 62.

Control processor 62 is provided by one or more processor or microprocessor circuits. A memory 64 couples to control processor 62. Memory 64 stores programming instructions which are executed by control processor 62 to perform procedures that are discussed below. In addition, memory 64 stores tables, databases, and variables which are useful in controlling the operation of subscriber node 16. A timer 66 also couples to processor 62. Timer 66 allows control processor 62 to keep track of time and to follow the time division multiplex protocol discussed above in connection with FIG. 4. An I/O section 68 couples to control processor 62, allows a user to control the operational modes of subscriber node 16, and provides ports through which data communicated through network 10 pass.

FIG. 5 illustrates some of the control processor's functions in a block diagram format. In particular, FIG. 5 illustrates functions which relate to the control of radio system 60. These functions allow subscriber node 16 to adapt to particular situations to select a mode of operation that achieves a high likelihood of successful communication with base node 12.

Radio system 60 provides an indication of the quality of a signal 58 being received at a bit error rate (BER) output. The preferred embodiment of the present invention uses conventional techniques to measure and generate bit error rate information, but alternate embodiments may measure signal strength, signal-to-noise ratios, or other indicators of signal quality. This bit error rate information or other symbol quality information drives a symbol rate predictor 70. Symbol rate predictor 70 predicts a maximum symbol rate at which successful communications may take place in response to the signal quality information.

For purposes of the present invention, the symbol rate describes the rate at which symbols, which convey one or more bits of user and/or system data, are passed through a communication link regardless of data compression, data encryption, error correction, and other translations of data that may take place prior to transmission and after reception. In contrast to symbol rate, a data rate describes the rate at which subscriber data are communicated between nodes. The data rate is affected by data compression, data encryption, error correction, and transmission symbol rate.

FIG. 6 shows a graph depicting an analysis performed by symbol rate predictor 70 to predict symbol rates based upon signal quality information. This analysis may be performed by table look up or other well known techniques. FIG. 6 shows that when signal quality declines, as indicated by an increase in bit error rate (BER), the data rate likewise declines. However, the forward error correction (FEC) process being applied also plays a role. If little or no FEC is currently applied, then a symbol rate may be maintained by using a more inclusive FEC process. A more inclusive FEC process increases the ratio of error detection and correction data to subscriber data conveyed per symbol. Thus, the data rate declines slightly, but the symbol rate may be maintained.

If signal quality is so poor that even highly inclusive FEC processes cannot sufficiently correct anticipated errors, a lower symbol rate may be used where more energy is available per bit. Symbol rate predictor 70 (see FIG. 5) determines whether a given signal quality resides above or below the point where even an inclusive FEC process cannot sufficiently correct expected errors. This point is referred to as 20Y in FIG. 6.

Referring back to FIG. 5, the output from symbol rate predictor 70 feeds a data rate controller 72. Data rate controller 72 defines a minimum data rate which is needed for the communication service to be provided by network 10. The data rate may be identified in response to many different factors. For example, the type of data being communicated has an influence. Real time video data, graphics data, and large file data transfers may require high data rates while real time audio data, textual data, and small file data transfers may require only a low data rate. In addition, a subscriber may specify the use of a low data rate to minimize service charges or a high data rate to save time.

In response to the identified data rate needed for the service and the predicted symbol rate supported by the communication link with network 10, a symbol rate controller 74 controls a symbol rate and/or frequency band parameter of radio system 60.

FIG. 7 shows a graph depicting frequency bands used by communication network 10. As shown in FIG. 7, network 10 preferably uses at least a narrow frequency band 75 and a wide frequency band 77. Desirably, wide band 77 is used to communicate data at a high symbol rate and narrow band 75 is used for communicating data at a low symbol rate. The use of two bands allows low rate communications to occur simultaneously with high rate communications. In other words, wide band 77 is not wasted conveying low symbol rate data but is preserved for conveying high symbol rate data.

While FIG. 7 depicts the use of two frequency bands, additional bands may be used to handle additional communications at similar or different symbol rates. Accordingly, network 10 may utilize frequency diversity (i.e. multiple frequency bands) as well as time diversity (i.e. allocated subscriber data slots) to multiplex diverse communications through the spectrum used by network 10. Frequency diversity is further used to allow nodes 12 and 16 of network 10 to adapt their symbol rate to accommodate a particular signal quality available at a given place and time. By allowing slower communications in a cell 14 (see FIG. 1) to take place in a narrow frequency band when quality is poorer or when faster communications are not needed, a wide frequency band remains available for faster communications that may not be hampered by poorer signal quality.

Referring back to FIG. 5, symbol rate controller 74 controls radio system 60 to operate in the appropriate frequency band. An FEC controller 76 receives information from data rate controller 72 and interfaces to a data input of radio system 60. FEC controller applies forward error correction encoding and decoding to subscriber data passing through radio system 60. FEC controller 76 is configured to include various diverse FEC coding processors 78. The diverse processors 78 add or remove different amounts of error detection and correction data to the subscriber data being conveyed. As the percentage of FEC coding increases, the ratio of subscriber data rate to symbol rate decreases. One of FEC coding processors 78 is selected and applied in response to the signal quality and the desired data rate. Generally speaking, the control of FEC coding provides fine tuning of the data rate while the control of symbol rate provides coarse tuning. Together, the adaptable FEC coding and adaptable symbol rate provide precise matching of data rate to current RF broadcast conditions.

A channel controller 80 receives information from data rate controller 72 and controls a slot timing input of radio system 60. In response to data rate information, channel controller 80 determines whether to use direct or indirect communication to converse with base node 12. As discussed above, different sub-frames are used when communicating with base node 12 than when communicating with a repeating subscriber node 16'. Thus, channel controller 80 controls timing so that appropriate sub-frames are used to accomplish direct or indirect communication with base node 12.

Figure 8:
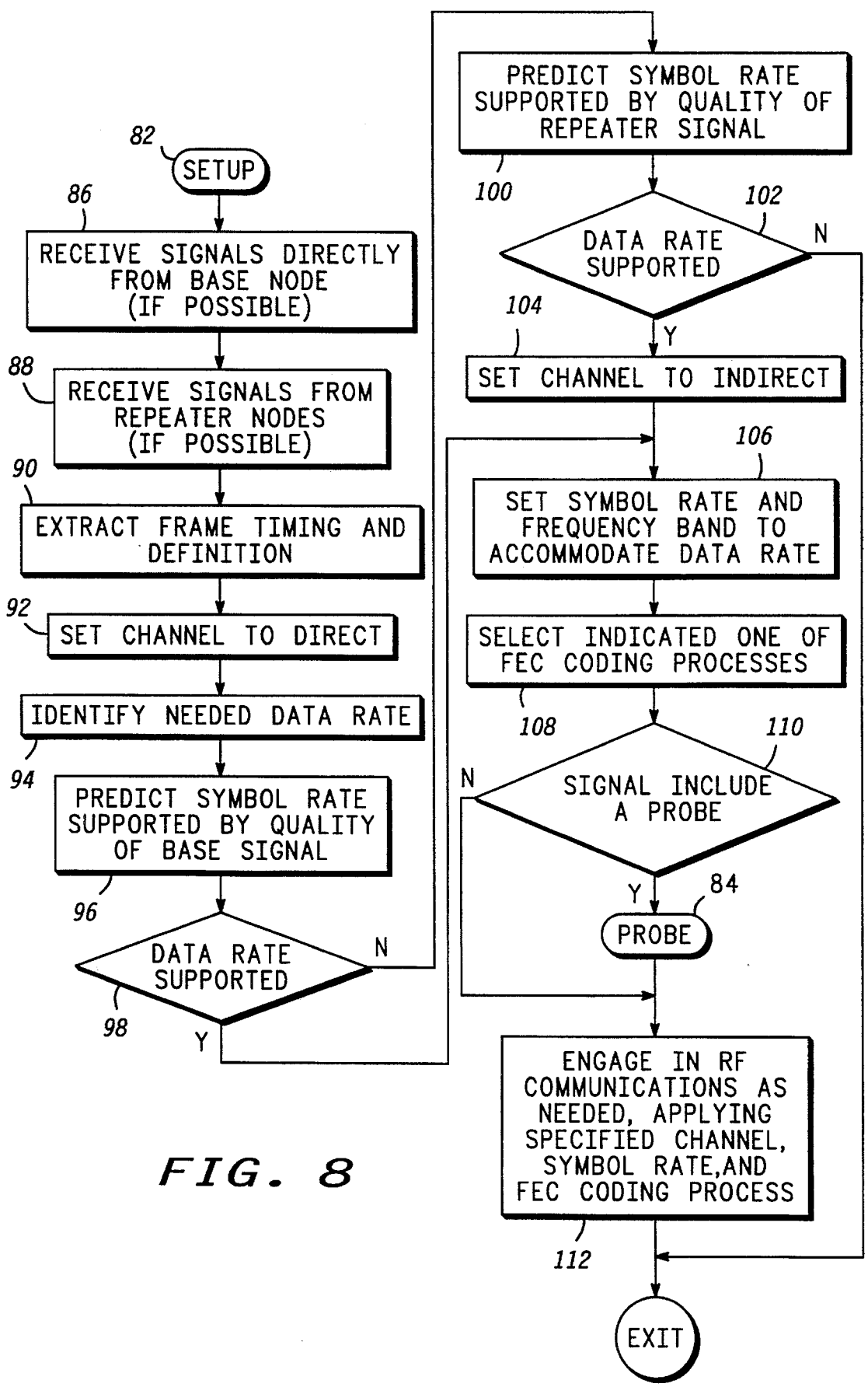
FIG. 8 shows a flow chart depicting a setup procedure performed by a subscriber node.
Figure 9:
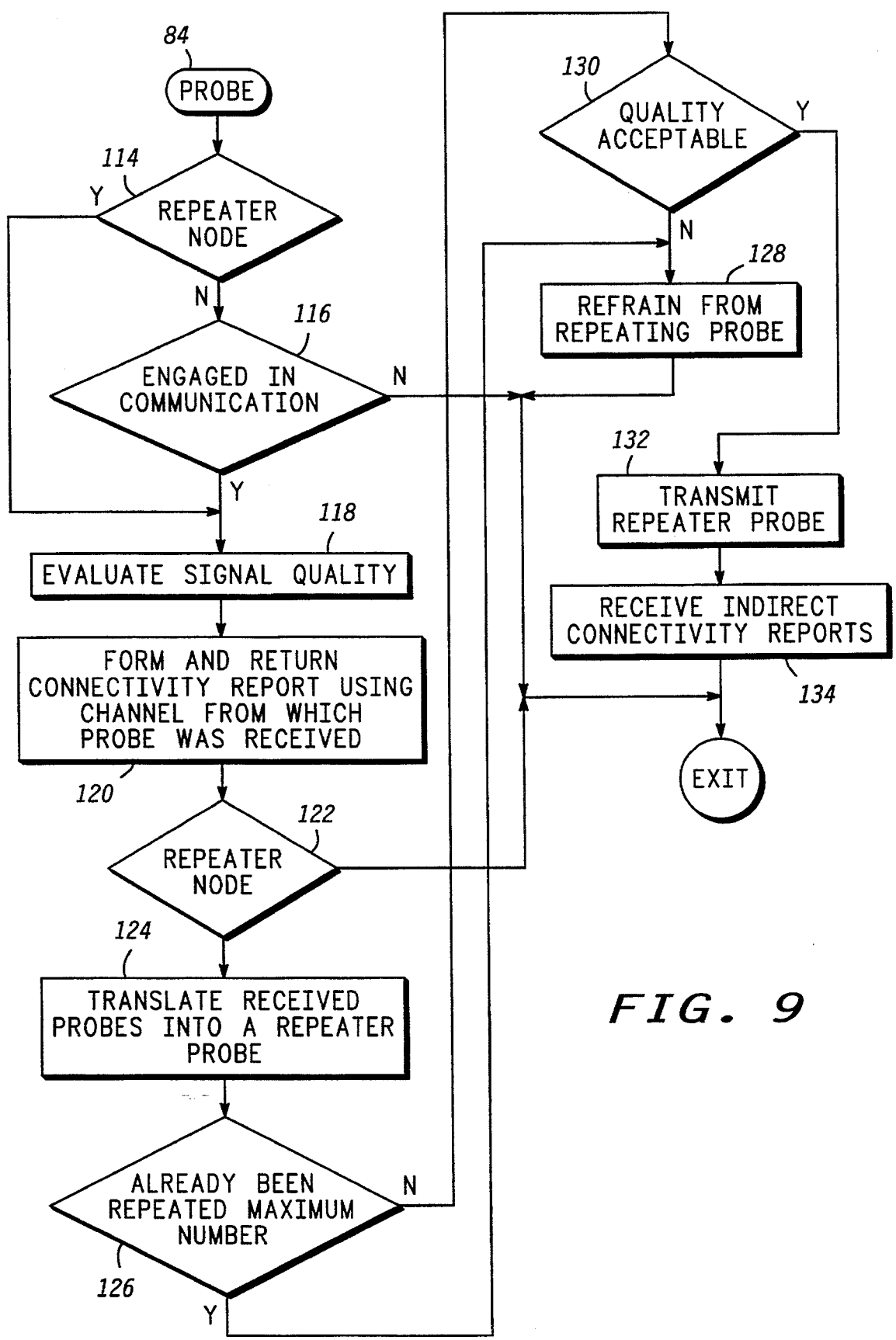
FIG. 9 shows a flow chart depicting a probe procedure performed by a subscriber node.

FIGS. 8 and 9 show flow charts of tasks performed by subscriber nodes 16. FIG. 8 shows a flow chart depicting a setup procedure 82, and FIG. 9 shows a flow chart depicting a probe procedure 84. Setup procedure 82 generally controls radio system 60 (see FIG. 5) to achieve a high likelihood of successful communications. Probe procedure 86 generally controls responses to probes 36 and 42 (see FIG. 3) and operation as a repeating subscriber node 16'.

Referring to FIG. 8, setup procedure 82 performs a task 86 to receive signals directly from base node 12. Of course, an obstruction 18 or other factor may prevent subscriber node 16 from directly receiving a signal transmitted from base node 12. In response to directly receiving a signal from base node 12, radio system 60 desirably evaluates signal quality, as discussed above. Next, a task 88 receives signals from repeating subscriber nodes 16'. Nothing requires the repeating subscriber node signals to be present during task 88, but if present radio system 60 evaluates signal quality.

After task 88, a task 90 is performed to extract frame timing and definition data from the received signals. Generally speaking, frame timing and definition data obtained directly from base node 12 has precedence over reconstructed frame timing and definition data that has been repeated by a repeating subscriber node 16'. Next, a task 92 sets a control variable to indicate use of a direct channel, as opposed to an indirect channel, for communication with base node 12. Task 92 establishes a default condition of direct communication and performs a portion of the functions of channel controller 80 (see FIG. 5).

Next, a task 94 implements a portion of data rate controller 72 (see FIG. 5) and identifies the data rate needed for any upcoming communication session. The data rate may be specified in response to the type of data to be communicated, user inputs, and the like. After task 94, a task 96 implements a portion of symbol rate predictor 70 (see FIG. 5) and predicts the symbol rate that may be supported by direct communication with base node 12 given the quality of the signal received from base node 12. If no base node signal was received above in task 86, a zero symbol rate may be predicted.

After task 96, a query task 98 implements another portion of data rate controller 72 (see FIG. 5) and determines whether the data rate identified above in task 94 is supported by the quality of signal being received directly from base node 12. If this data rate is supported, then program control will proceed to setup radio system 60 to communicate directly with base node 12 in a manner that achieves the needed data rate while maintaining a minimum bit error rate. However, if the data rate is not supported, then setup procedure 82 performs further investigations to determine if an indirect channel may be available through which the needed data rate may be achieved.

In particular, when the needed data rate is not supported by the quality of signal received directly from base node 12, a task 100 predicts the symbol rate that may be supported by indirect communication through a repeating subscriber node 16'. If no repeating subscriber node signal was received above in task 88, a zero symbol rate may be predicted. After task 100, a query task 102 determines whether the data rate identified above in task 94 is supported by the quality of signal being received through a repeating subscriber node 16'. If the data rate is still not supported, then program control exits procedure 82. At this point, an appropriate error handling routine may address the lack of a suitable data rate. The error handling routine may, for example, request a user or an automated process to authorize a slower data rate. Thus, for example, if current conditions do not accommodate a sufficiently high data rate for video communications, audio communications may be possible.

When task 102 determines that the repeating subscriber node signal supports the needed data rate, a task 104 overcomes the default channel selection and sets the channel to indicate indirect communication. After task 104, and when task 98 indicates that direct communication may support the needed data rate, a task 106 is performed. At task 106, the communication channel, whether direct or indirect, has been determined. Task 106 now sets the symbol rate and frequency band to accommodate the data rate. Task 106 generally performs a portion of symbol rate controller 74 (see FIG. 5). After task 106, a task 108 selects an indicated one of FEC coding processes 78 (see FIG. 5). An appropriate FEC coding process 78 may be selected by performing an analysis upon data similar to that presented graphically in FIG. 6. Given a symbol rate and data rate, a predetermined bit error rate suggests which FEC process 78 to select.

After task 108, a query task 110 determines whether the signal to which subscriber node 16 is responding includes a probe, which may be either a base probe 36 or a repeater probe 42 (see FIG. 4). If a probe is included, then program control proceeds to procedure 84 to respond to the probe. After procedure 84, or when query task 110 determines that the signal does not include a probe, a task 112 is performed. At task 112 subscriber node 16 is free to engage in RF communications if needed. If subscriber node 16 engages in RF communications, such communications will take place applying the channel specified above in either task 92 or 104, the symbol rate specified above in task 106, and the FEC coding process specified above in task 108. After task 112, program control exits setup procedure 82. Of course, program control may again enter procedure 82 from time to time as needed.

Referring to FIG. 9, probe procedure 84 is performed when a subscriber node 16 receives a signal, either from a base node 12 or a repeating subscriber node 16', that includes a probe. Procedure 84 performs a query task 114 to determine whether the subscriber node 16 performing procedure 84 considers itself to be a repeating subscriber node 16'. As discussed above, certain subscriber nodes 16 may not perform repeater functions so that they may conserve their battery reserves. If the current subscriber node 16 is not a repeating subscriber node 16', a query task 116 determines whether the node 16 is currently engaged in a communication session with base node 12, either directly or through a repeating subscriber node 16'. If a non-repeating subscriber node is not engaged in communication, program control exits probe procedure 84 and returns to setup procedure 82 (see FIG. 8).

However, if the subscriber node 16 is a repeating subscriber node 16' or is currently engaged in communicating, a task 118 is performed. Task 118 evaluates the signal being received to generate a bit error rate parameter, a signal strength parameter, a signal-to-noise ratio parameter, or other indication of signal quality. Next, a task 120 forms and returns a connectivity report using the channel from which the probe was received. In other words, if the probe was received through a direct channel, then the corresponding connectivity report is returned through the direct channel for connectivity reports, as indicated by sub-frame 38. If the probe was received through an indirect channel, then the corresponding connectivity report is returned through the repeater channel, as indicated by sub-frame 43.

The connectivity report, whether direct or indirect, includes the ID of the subscriber node 16 making the report and conveys data describing the quality of the signal measured at the subscriber node 16. In addition, the report includes like information for other subscriber nodes 16 whose connectivity reports have been received by the subscriber node and are being repeated back to base node 12.

A query task 122 next determines whether the node 16 is a repeating subscriber node 16'. If the node is not a repeating subscriber node 16', program control exits probe procedure 84 and returns to setup procedure 82 (see FIG. 8).

If the node 16 performing procedure 84 is a repeating subscriber node 16', a task 124 translates any probes it has received into a repeater probe and repeats the probe during repeater probe sub-frame 42 (see FIG. 3). The translated probes desirably include sufficient data for a receiving subscriber node 16 to determine frame timing and definitions. In addition, the translated probe desirably includes the identities and signal qualities of other nodes 16 from which probes have been received. However, nothing requires task 124 to include all probes it may have received in its repeated probe. Rather, task 124 may ignore probes which are clearly inferior and include only the best probes, such as those that are associated with the best signal quality and fewest number of repetitions.

After task 124, a query task 126 determines whether the repeat probe which was constructed during task 124 has already been repeated a maximum number of times. Desirably, this maximum will be limited to a number in the range of 1–6. Thus, repeated probes will not propagate indefinitely and the amount of spectrum that is dedicated to repeating messages will be limited so that more spectrum is available to convey non-redundant subscriber data. If the repeated probe has already been repeated a maximum number of times, a task 128 refrains from repeating the probe, and program control exits procedure 84.

On the other hand, if task 126 determines that the repeat probe it is constructing has not been repeated a maximum number, a query task 130 determines whether the signal quality in the communication links leading to the subscriber node 16 indicate a sufficiently acceptable quality to justify further repetition. If acceptable signal quality is not indicated, task 128 refrains from repeating the probe, and program control exits procedure 84.

When a repeater probe has not already been repeated too many times and indicates an acceptable signal quality, a task 132 is performed to transmit the repeater probe during subframe 42 (see FIG. 3). Next, a task 134 is performed to collect any connectivity reports which are received during repeater connectivity sub-frame 43 (see FIG. 3) in response to the repeater probe. These connectivity reports will be stored and later forwarded to base node 12 during the next sub-frame 38 (see FIG. 3) under the control of task 120. After task 134, program control exits procedure 84 and returns to procedure 82. Accordingly, repeating subscriber nodes 16' establish the indirect channels through which obstructed subscriber nodes 16 may communicate with base node 12. While repeating subscriber nodes 16' repeat probe messages they receive, they do so only under controlled conditions which suggest good indirect channels. Spectrum is not unnecessarily wasted repeating redundant messages.

In summary, the present invention provides an improved high bandwidth communication network, corresponding network nodes, and methods and processes for operating the network and its nodes. The present invention provides a high bandwidth communication network that uses RF broadcast communication links so that the network nodes need not couple to landlines and need not remain stationary. These RF links operate at high frequencies but still achieve widespread coverage. A range of data communication rates, symbol rates, and message routing paths are accommodated to enhance the likelihood of successfully communicating within a given coverage area. However, the use of repeated routing paths is placed at a lower priority, and probes are evaluated to determine whether repeating is justified for given circumstances. Thus, a high likelihood of successfully delivering communications within an area of coverage is achieved without significantly reducing the quantity of communications that can be handled. The present invention is compatible with the existing infrastructure of the audio cellular communication network and desirably takes advantage of some of its existing facilities.

The present invention has been described above with reference to preferred embodiments. However, those skilled in the art will recognize that changes and modifications may be made in these preferred embodiments without departing from the scope of the present invention. For example, those skilled in the art may devise a wide variety of alternate process flows to accomplish methods equivalent to those discussed herein. These and other changes and modifications which are obvious to those skilled in the art are intended to be included within the scope of the present invention.

What is claimed is:

1. A method of operating a high bandwidth communication network, said method comprising the steps of:

directly receiving, at a subscriber node, signals transmitted from a base node;

identifying a communications service to be provided;

identifying a minimum data rate necessary to support said communications service;

determining whether to directly communicate between said base node and said subscriber node or to indirectly communicate between said base node and said subscriber node through a repeater subscriber node, selecting direct communication between said base node and said subscriber node when said data rate is supportable through direct communication with said base node; and engaging in communications over said network, said communications occurring through a communication channel selected in response to said determining step.

2. A method as claimed in claim 1 wherein said determining step further comprises the steps of:

determining, in response to said signals, a symbol rate supportable by communications with said base node; and selecting direct communication between said base node and said subscriber node when said data rate is possible with said symbol rate supportable through direct communication with said base node.

3. A method as claimed in claim 2 wherein:

said method additionally comprises the step of configuring said base node and said subscriber node to communicate at any one of two or more symbol rates; and said engaging step engages in communications occurring at a symbol rate selected in response to said symbol rate determining step.

4. A method as claimed in claim 3 wherein:

said base node and said subscriber node are configured to engage in communications in either of a first frequency band or a second frequency band, wherein the first frequency band accommodates a higher symbol rate than the second frequency band; and said engaging step transmits radio frequency (RF) signals and comprises the step of selecting one of said first frequency band or said second frequency band in response to said symbol rate determining step.

5. A method as claimed in claim 1 wherein:

said method additionally comprises the step of configuring said nodes to communicate using any one of two or more forward error correction (FEC) coding processes;

said method additionally comprises the step of selecting one of said FEC coding processes to use in encoding and decoding said communications; and said engaging step comprises the step of applying said selected one of said FEC coding processes to data communicated over said network.

6. A method as claimed in claim 1 wherein said engaging step comprises the step of transmitting radio frequency (RF) signals.

7. A method as claimed in claim 6 wherein said RF signals exhibit a frequency greater than 2 GHz.

8. A method as claimed in claim 6 wherein:

said RF signals are in either of a relatively wider frequency band that accommodates a relatively higher symbol rate or a relatively narrower frequency band that accommodates a relatively lower symbol rate; and said engaging step comprises the step of selecting one of said relatively wider and relatively narrower frequency bands in response to said determining step.

9. A method of operating a high bandwidth communication network, said method comprising the steps of:

transmitting a probe message from a base node to a repeater subscriber node;

deciding, at said repeater subscriber node in response to said probe message, whether to repeat said probe message or to refrain from repeating said probe message;

configuring said repeater subscriber node to either repeat said probe message or to refrain from repeating said probe message;

determining whether to directly communicate between said base node and a subscriber node or to indirectly communicate between said base node and said subscriber node through said repeater subscriber node; and engaging in communications over said network, said communications occurring through a communication channel selected in response to said determining step.

10. A method as claimed in claim 9 wherein said deciding step decides to refrain from repeating said probe message when said probe message has previously been repeated a predetermined number of times.

11. A method as claimed in claim 9 additionally comprising the steps of:

evaluating signal quality at said repeater subscriber node; and transmitting a connectivity message from said repeater subscriber node to said base node, said connectivity message identifying said repeater subscriber node to said base node and characterizing said signal quality.

12. A method of operating a high bandwidth communication network, said method comprising the steps of:

configuring a node which communicates over said network to communicate at any one of two or more symbol rates and with any one of two or more forward error correction (FEC) coding processes;

identifying a communications service to be provided;

identifying a minimum data rate necessary to support said communications service over said network;

determining, in response to said data rate identifying step whether to engage in direct communication between said node and a second node or to indirectly communicate between said node and said second node through a third node; and engaging in communications over said network through a communication channel selected in response to said determining step, said communications occurring at a symbol rate selected in response to said data rate identifying step and with an FEC coding process selected in response to said data rate identifying step.

13. A method as claimed in claim 12 wherein said determining step comprises the steps of:

receiving, at said node, signals transmitted from said second and third nodes;

determining, in response to said signals, a symbol rate supportable by said direct communication between said node and said second node; and selecting said direct communication between said node and said second node when said symbol rate is supportable through direct communication with said second node.

14. A method of operating a high bandwidth communication network, said method comprising the steps of:

configuring a node which communicates over said network to communicate at any one of two or more symbol rates and with any one of two or more forward error correction (FEC) coding processes;

identifying a communications service to be provided;

identifying a minimum data rate necessary to support said communications service over said network:

transmitting a probe message from a second node to a third node;

deciding, at said third node in response to said probe message, whether to repeat said probe message or to refrain from repeating said probe message;

configuring said third node to either repeat said probe message or to refrain from repeating said probe message;

determining whether to engage in direct communication between said node and said second node or to indirectly communicate between said node and said second node through said third node; and engaging in communications over said network through a communication channel selected in response to said determining step, said communication occurring at a symbol rate selected in response to said data rate identifying step and with an FEC coding process selected in response to said data rate identifying step.

15. A wireless communication network subscriber node for use in a network having a high likelihood of successful communications within a coverage area, said node comprising:

a symbol rate controller configured to allow said node to communicate at any one of two or more symbol rates;

a forward error correction (FEC) controller configured to apply any one of two or more FEC coding processes data being communicated;

a symbol rate predictor configured to predict a symbol rate which may be supported by communications between said subscriber node and a base node; and a data rate controller, coupled to said symbol rate predictor, symbol rate controller, and FEC controller, said data rate controller being configured to define a data rate at which to engage in communications over said network based on information received from said symbol rate predictor and said data rate controller.

16. A subscriber node as claimed in claim 15 wherein said communications are conveyed by radio frequency (RF) signals exhibiting frequencies greater than 2 GHz.

17. A subscriber node as claimed in claim 15 additionally comprising a radio coupled to said symbol rate controller and configured to engage in communications in either of a first frequency band or a second frequency band, wherein the first frequency band accommodates a higher symbol rate than the second frequency band; and said symbol rate controller is configured to select one of said relatively wider and relatively narrower frequency bands in response to said data rate controller.

18. A subscriber node as claimed in claim 15 additionally comprising a channel controller coupled to said data rate controller, said channel controller being configured to determine whether to engage in direct communication between said subscriber node and said base node or to indirectly communicate between said subscriber node and said base node through a repeater subscriber node.

19. A subscriber node as claimed in claim 18 wherein:

said subscriber node additionally comprises a radio coupled to said symbol rate predictor and configured to receive signals transmitted from said base and repeater subscriber nodes;

said symbol rate predictor is configured to predict symbol rates supportable by said direct communication between said subscriber node and said base node; and said channel controller is configured to select direct communication between said subscriber node and said base node when said data rate is compatible with said symbol rate predicted for direct communication with said base node.

* * * * *